US010387722B2

(12) United States Patent
Wang

(10) Patent No.: US 10,387,722 B2
(45) Date of Patent: Aug. 20, 2019

(54) SYSTEMS AND METHODS FOR PROVIDING QUANTITATIVE EVALUATION OF MAP QUALITY

(71) Applicant: Facebook, Inc., Menlo Park, CA (US)

(72) Inventor: Yin Wang, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 123 days.

(21) Appl. No.: 14/942,811

(22) Filed: Nov. 16, 2015

(65) Prior Publication Data

US 2017/0140218 A1    May 18, 2017

(51) Int. Cl.
*G06K 9/62* (2006.01)
*G06K 9/00* (2006.01)
*G06T 7/00* (2017.01)

(52) U.S. Cl.
CPC ........ *G06K 9/00476* (2013.01); *G06T 7/0002* (2013.01); *G06T 2207/10024* (2013.01); *G06T 2207/30168* (2013.01)

(58) Field of Classification Search
CPC .................................................. G06K 9/00476
See application file for complete search history.

(56) References Cited

U.S. PATENT DOCUMENTS

2006/0041375 A1* 2/2006 Witmer ................. G01C 15/00
                                                                701/532

OTHER PUBLICATIONS

Chen, "Automatically and Accurately Conflating Road Vector Data, Street Maps and Orthoimagery", May 2005, pp. i-xii, and 1-133. (Year: 2005).*
Liu, Xuemei et al., "Mining Large-Scale, Sparse GPS Traces for Map Inference: Comparison of Approaches," Proceedings of the 18th ACM SIGKDD International Conference on Knowledge Discovery and Data Mining (KDD '12), pp. 669-677, Aug. 2012.
Mnih, Volodymyr, "Machine Learning for Aerial Image Labeling," PhD Thesis, University of Toronto, 2013.

* cited by examiner

*Primary Examiner* — Brian Werner
(74) *Attorney, Agent, or Firm* — Sheppard Mullin Richter & Hampton LLP

(57) ABSTRACT

Systems, methods, and non-transitory computer-readable media can acquire a first map that represents a particular geographical region. The first map can be associated with an image map. A first vector map can be generated based on the image map with which the first map is associated. A second map that represents the particular geographical region can be acquired. The second map can be different from the first map and can be associated with a second vector map. One or more quantitative evaluations for at least one of the first map or the second map can be provided based on the first vector map and the second vector map.

20 Claims, 13 Drawing Sheets

400

Acquire a first map that represents a particular geographical region and that is associated with an image map
402

Generate a first vector map based on the image map with which the first map is associated
404

Acquire a second map that represents the particular geographical region
406

Provide, based on the first vector map and the second vector map, one or more quantitative evaluations for at least one of the first map or the second map
408

FIGURE 4

SYSTEMS AND METHODS FOR PROVIDING QUANTITATIVE EVALUATION OF MAP QUALITY

FIELD OF THE INVENTION

The present technology relates to the field of digital or electronic maps. More particularly, the present technology relates to techniques for providing quantitative evaluation of map quality.

BACKGROUND

Today, people often utilize computing devices (or systems) for a wide variety of purposes. Users can use their computing devices to, for example, interact with one another, access content, share content, and create content. In some cases, users can utilize their computing devices to download, view, access, or otherwise interact with maps, such as digital or electronic maps. For instance, users of a social networking system (or service) can, via their computing devices, access maps by browsing information about places or by checking in at various places. In another instance, users can utilize their computing devices to access web resources, applications, or other map systems that provide maps.

In general, different map systems, services, or sources can provide different maps. Under conventional approaches rooted in computer technology, attempting to evaluate or compare different maps can be challenging, inconvenient, or inefficient. For example, if two maps are image-based maps, then evaluating the two maps in accordance with conventional approaches can involve visual comparisons, which can be inaccurate or inefficient. Moreover, such evaluations under conventional approaches can lack quantitative information or details. As such, conventional approaches can create challenges for or reduce the overall experience associated with utilizing maps.

SUMMARY

Various embodiments of the present disclosure can include systems, methods, and non-transitory computer readable media configured to acquire a first map that represents a particular geographical region. The first map can be associated with an image map. A first vector map can be generated based on the image map with which the first map is associated. A second map that represents the particular geographical region can be acquired. The second map can be different from the first map and can be associated with a second vector map. One or more quantitative evaluations for at least one of the first map or the second map can be provided based on the first vector map and the second vector map.

In an embodiment, the first map can provide a first set of roads determined by a first map system to be included in the particular geographical region. The second map can provide a second set of roads determined by a second map system to be included in the particular geographical region.

In an embodiment, generating the first vector map based on the image map with which the first map is associated can further comprise identifying, in the image map, the first set of roads provided by the first map. One or more irrelevant portions in the image map can be filtered out. A set of vectors representing the first set of roads can be provided. The first vector map can include the set of vectors.

In an embodiment, the set of vectors included in the first vector map can be smoothed based on a vector smoothing process.

In an embodiment, identifying, in the image map, the first set of roads provided by the first map can further comprise selecting a first color associated with the first set of roads provided by the first map. A first set of one or more map portions in the image map that have, within an allowable first color deviation, the first color can be identified.

In an embodiment, filtering out the one or more irrelevant portions in the image map can further comprise identifying a second set of one or more map portions in the image map that are colored differently from the first color and that are outside the allowable first color deviation. The second set can be colored with a second color different from the first color. A blurring process can be applied to the image map including the first color and the second color. The allowable first color deviation can be broadened to produce a broadened allowable first color deviation. A third set of one or more map portions in the image map that are colored differently from the first color and that are outside the broadened allowable first color deviation can be identified. The third set can be colored with the second color. The one or more irrelevant portions can be colored with the second color.

In an embodiment, filtering out the one or more irrelevant portions in the image map can further comprise detecting one or more borders of the image map. A fourth set of one or more map portions in the image map that have, within the broadened allowable first color deviation, the first color and that are disconnected, via the first color within the broadened allowable first color deviation, to the one or more borders of the image map can be identified. The fourth set can be colored with the second color. The one or more irrelevant portions can be colored with the second color.

In an embodiment, identifying, in the image map, the first set of roads provided by the first map can further comprise identifying a fifth set of one or more map portions in the image map that have, within the broadened allowable first color deviation, the first color. Each vector in the set of vectors can be centered with respect to a respective map portion in the fifth set.

In an embodiment, the first vector map can include a first set of vectors. The second vector map can include a second set of vectors. The one or more quantitative evaluations can compare each vector segment in the first set of vectors with a respective vector segment in the second set of vectors.

In an embodiment, the one or more quantitative evaluations can include at least one of a precision evaluation or a recall evaluation.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates an example method associated with providing quantitative evaluation of map quality, according to an embodiment of the present disclosure.

Figure 1:
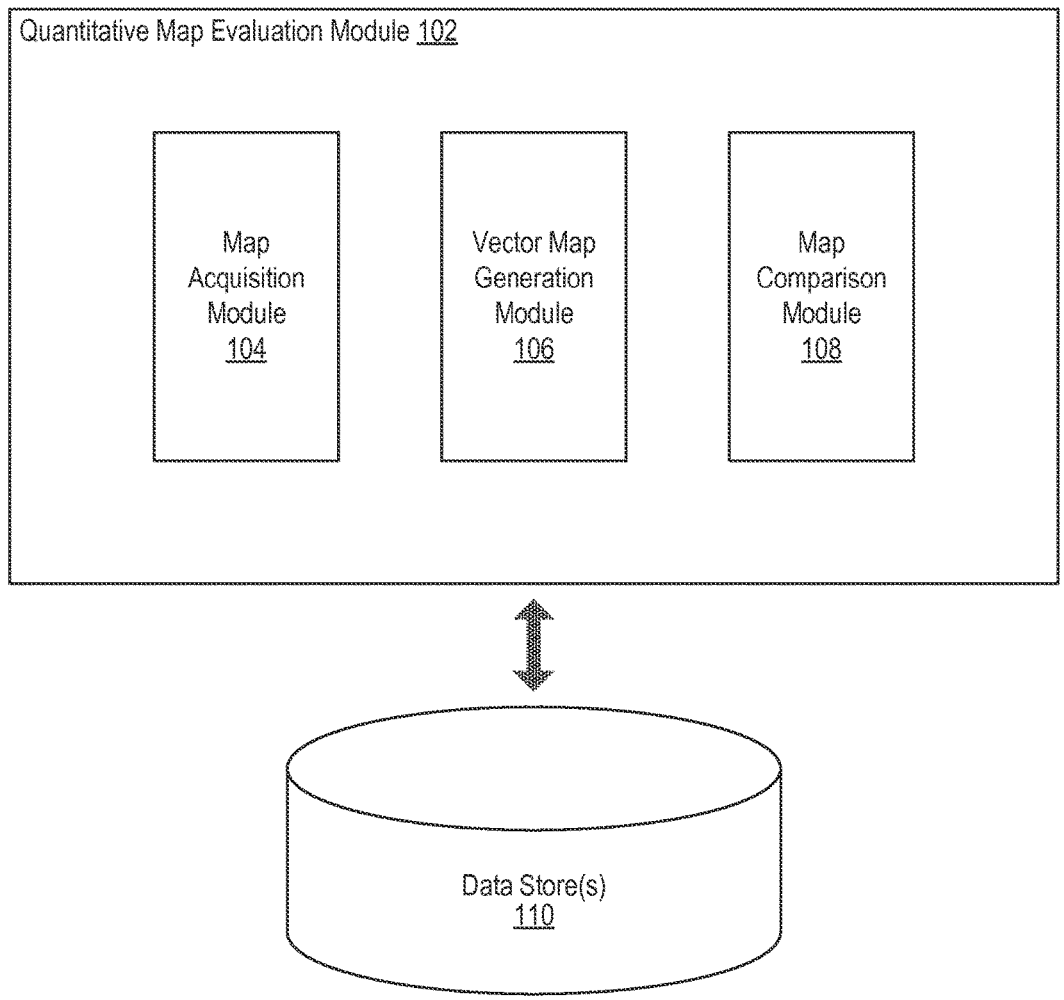
FIG. 1 illustrates an example system including an example quantitative map evaluation module configured to facilitate providing quantitative evaluation of map quality, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Quantitative Evaluation of Map Quality

People use computing systems (or devices) for various purposes. Users can utilize their computing systems to establish connections, engage in communications, interact with one another, and/or interact with various types of content. In some cases, a user of a computing device can utilize one or more maps, such as digital or electronic maps. For instance, the user can utilize his or her computing device to navigate to a social networking system (or service) and to access maps provided via the social networking system, such as when browsing through pages of places and/or when checking in at various places. In some cases, the user can utilize the computing device to access one or more maps provided via a map system, service, or source. In one example, the user can access maps provided via a map web resource, such as an online map service or a map website. In another example, the user can access maps provided via a map application, such as a locational app or a navigational app.

In general, different map systems (or services, sources, etc.) can provide different maps. For instance, even for the same geographical region or location, two maps from two different map systems can provide different map information or details, such as differences in roads (e.g., streets, avenues, highways, etc.). In some cases, it can be useful to evaluate or assess the quality of a map and/or to compare multiple maps. However, conventional approaches rooted in computer technology for map evaluation is generally inefficient, inconvenient, or inaccurate. For example, given two image-based maps (i.e., image maps), conventional approaches often times attempt to visually or graphically compare the two image maps, which can be inaccurate and inefficient. Furthermore, in some instances, conventional approaches to map evaluation can be lacking with respect to quantitative or objective assessment of maps. Accordingly, such conventional approaches can be inefficient, ineffective, or inconvenient and can reduce the overall experience associated with utilizing maps.

Due to these or other concerns, conventional approaches can be disadvantageous or problematic. Therefore, an improved approach can be beneficial for addressing or alleviating various drawbacks associated with conventional approaches. Based on computer technology, the disclosed technology can provide quantitative evaluation of map quality. Various embodiments of the present disclosure can include systems, methods, and non-transitory computer readable media configured to acquire a first map that represents a particular geographical region. The first map can be associated with an image map. A first vector map can be generated based on the image map with which the first map is associated. A second map that represents the particular geographical region can be acquired. The second map can be different from the first map and can be associated with a second vector map. One or more quantitative evaluations for at least one of the first map or the second map can be provided based on the first vector map and the second vector map. It is contemplated that there can be many variations and/or other possibilities associated with the disclosed technology.

FIG. 1 illustrates an example system 100 including an example quantitative map evaluation module 102 configured to facilitate providing quantitative evaluation of map quality, according to an embodiment of the present disclosure. As shown in the example of FIG. 1, the quantitative map evaluation module 102 can include a map acquisition module 104, a vector map generation module 106, and a map comparison module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the quantitative map evaluation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the quantitative map evaluation module 102 can be implemented, in part or in whole, as software running on one or more computing devices or systems, such as on a user or client computing device. For example, the quantitative map evaluation module 102 or at least a portion thereof can be implemented as or within an application (e.g., app), a program, an applet, or an operating system, etc., running on a user computing device or a client computing system, such as the user device 610 of FIG. 6. In another example, the quantitative map evaluation module 102 or at least a portion thereof can be implemented using one or more computing devices or systems that include one or more servers, such as network servers or cloud servers. In some instances, the quantitative map evaluation module 102 can, in part or in whole, be implemented within or configured to operate in conjunction with a social networking system (or service), such as the social networking system 630 of FIG. 6. It should be appreciated that there can be many variations or other possibilities.

The map acquisition module 104 can be configured to facilitate acquiring a first map that represents a particular geographical region (or location, area, etc.). The first map can be associated with an image map. For instance, the first map can correspond to a map (or a map portion, a map area, one or more map tiles, etc.) that takes the form of an image, such as a raster image, a scanned image, a satellite image, or an aerial image, etc. The map acquisition module 104 can also be configured to facilitate acquiring a second map that represents the particular geographical region. In some cases, the second map can be different from the first map. In one example, the second map can correspond to or be associated with a second image map. In another example, the second map can correspond to or be associated with a second vector map. For example, the second map can correspond to a map (or a map portion, a map area, etc.) that is represented by vectors rather than by an image. In some instances, the second map can be represented by or can be associated with the second image map, and the second vector map can be generated based on the second image map.

In some embodiments, the first map can provide a first set of roads determined by a first map system (or service, source, etc.) to be included in the particular geographical region. The second map can provide a second set of roads determined by a second map system (or service, source, etc.) to be included in the particular geographical region. For example, the first map can be acquired from the first map system, which can incorporate the first set of roads into the first map in attempt to represent one or more real-world routes, streets, alleys, avenues, highways, expressways, etc., within the particular geographical region. The second map can be acquired from the second map system, which can incorporate the second set of roads into the second map in attempt to represent the one or more real-world routes, streets, alleys, avenues, highways, expressways, etc., within the particular geographical region. In this example, the first map system and the second map system can be different and, as a result, the first set of roads can be different from the second set of roads and the first map can be different from the second map. The disclosed technology can, for instance, enable quantitative evaluation or comparison of the first map and the second map, such as based on vectors. In some cases, both the first map and the second map can already correspond to vector maps, such that the disclosed technology can enable quantitative evaluation or comparison based on vectors.

The vector map generation module 106 can be configured to facilitate generating vector maps based on image maps. In some implementations, the vector map generation module 106 can generate a first vector map based on the image map with which the first map is associated. Moreover, as discussed above, in one example, the second map can correspond to or be associated with a second vector map. In this example, the vector map generation module 106 can generate the second vector map based on a second image map with which the second was previously associated. For instance, the second map can initially correspond to or be associated with the second image map, and the vector map generation module 106 can generate the second vector map based on the second image map. More details regarding the vector map generation module 106 will be provided below with reference to FIG. 2A.

The map comparison module 108 can be configured to facilitate providing, based on the first vector map and the second vector map, one or more quantitative evaluations for at least one of the first map or the second map. For example, the map comparison module 108 can facilitate analyzing or assessing the similarities and/or differences between the first map and the second map, such as the similarities and/or differences between the first set of roads and the second set of roads within the same geographical region. The map comparison module 108 will be discussed in more detail below with reference to FIG. 2B.

Additionally, in some embodiments, the quantitative map evaluation module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the quantitative map evaluation module 102, such as map data. Again, it is contemplated that there can be many variations or other possibilities associated with the disclosed technology.

Figure 2A:
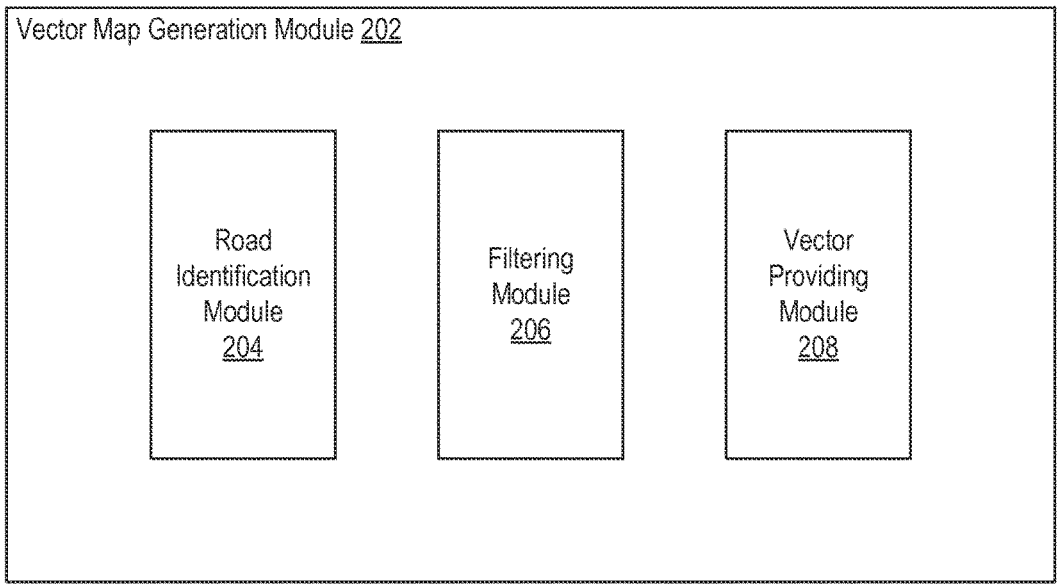
FIG. 2A illustrates an example vector map generation module configured to facilitate providing quantitative evaluation of map quality, according to an embodiment of the present disclosure.

FIG. 2A illustrates an example vector map generation module 202 configured to facilitate providing quantitative evaluation of map quality, according to an embodiment of the present disclosure. In some embodiments, the vector map generation module 106 of FIG. 1 can be implemented as the example vector map generation module 202. As shown in FIG. 2A, the vector map generation module 202 can include a road identification module 204, a filtering module 206, and a vector providing module 208.

As discussed previously, the vector map generation module 202 can be configured to facilitate generating a first vector map based on an image map with which a first map is associated. In some embodiments, the vector map generation module 202 can generate the first vector map by identifying, in the image map, the first set of roads provided by the first map, filtering out one or more irrelevant portions in the image map, and providing a set of vectors representing the first set of roads. The first vector map can include the set of vectors.

In some embodiments, the vector map generation module 202 can utilize the road identification module 204 to identify, in the image map, the first set of roads provided by the first map. The road identification module 204 can select a first color associated with the first set of roads provided by the first map. The road identification module 204 can identify a first set of one or more map portions in the image map that have, within an allowable first color deviation, the first color. In one example, roads, streets, and/or routes, etc., in the first map can have a white color. The road identification module 204 can select the first color as being white. Subsequently, the road identification module 204 can identify the first set of roads to include map portions in the image map that are white (or within a specified allowable deviation of being white). The identification of the first set of roads can be further refined, as described in more detail below.

In some implementations, the vector map generation module 202 can utilize the filtering module 206 to filter out the one or more irrelevant portions in the image map, such as noise, text, symbols, and/or non-road portions, etc. The filtering module 206 can identify a second set of one or more map portions in the image map that are colored differently from the first color and that are outside the allowable first color deviation. The filtering module 206 can cause the second set to be colored with a second color different from the first color. For example, the filtering module 206 can identify map portions that are not white (or not within the specified allowable deviation of being white) and can cause these map portions to instead be colored black.

Moreover, the filtering module 206 can apply a blurring process to the image map including the first color and the second color. For example, the filtering module 206 can apply a Gaussian blurring process to the image map, which includes the one or more white portions and the one or more black portions. As a result, some white colored noise that is surrounded by black can be blurred in the image map to more closely resemble the black color (e.g., appear as dark gray), whereas black text appearing within the white colored roads can be blurred in the image map to more closely resemble the white color (e.g., appear as light gray). The filtering module 206 can subsequently cause the allowable first color deviation to be broadened, thereby producing a broadened allowable first color deviation. For example, the filtering module 206 can lower the threshold for what is considered to be white colored, such that certain lighter shades of gray can be considered to be white colored. The filtering module 206 can then identify a third set of one or more map portions in the image map that are colored differently from the first color and that are outside the broadened allowable first color deviation. The filtering module 206 can further cause the third set to be colored with the second color. For instance, the dark gray noise surrounded by black can be considered to be outside the broadened allowable first color deviation (e.g., the lowered white color threshold) and the dark gray noise can then be colored black instead. In some cases, the one or more irrelevant portions can correspond to those portions in the image map that are colored with the second color (e.g., the black colored noise and other black colored non-road portions).

Also, the blurring of the black text within the white colored roads can cause the text to be filtered out as well, since the black text is blended with the white colored road to produce light gray text. In some cases, the filtering module 206 can cause one or more map portions that have the first color (or that are within the broadened allowable first color deviation) to be identified and can then cause these map portions to be colored with the first color. For example, the light gray text within the white roads can be considered to be white based on the lowered white color threshold, and then the light gray text can be colored with the white color. Accordingly, the text within the white roads can be filtered out or removed by the filtering module 206.

Furthermore, in some implementations, filtering out the one or more irrelevant portions in the image map can further comprise detecting, by the filtering module 206, one or more borders of the image map. The filtering module 206 can identify a fourth set of one or more map portions in the image map that have, within the broadened allowable first color deviation, the first color and that are disconnected, via the first color within the broadened allowable first color deviation, to the one or more borders of the image map. The filtering module 206 can color the fourth set with the second color. For example, there can be white or light gray colored text, symbols, fountains, plazas, squares, courts, courtyards, yards, and/or other map portions that are each entirely within a street block formed by surrounding roads and/or by the map borders. As such, in this example, these portions can be considered white colored but are not connected to the borders or edges of the image map via the white roads. Accordingly, these portions can correspond to or be included with the irrelevant portions and can be colored with the second color (and thus are filtered out or removed).

In addition, the identification of the first set of roads can be further refined, as discussed previously. In some embodiments, identifying, in the image map, the first set of roads provided by the first map can further comprise identifying a fifth set of one or more map portions in the image map that have, within the broadened allowable first color deviation, the first color. For example, the white roads including the light gray text can be identified as the first set of roads. In some instances, the white roads including the light gray text can be colored white, thereby filtering out or removing the text. Further, in some cases, the vector providing module 208 can cause each vector in the set of vectors to be centered with respect to a respective map portion in the fifth set, such as via a Voronoi diagram process. In some implementations, the vector providing module 208 can also utilize one or more edge or line detection processes to facilitate generating the set of vectors. Moreover, the vector providing module 208 can cause the set of vectors included in the first vector map to be smoothed based on a vector smoothing process, such as via a Douglas-Peucker process. It should be understood that all examples herein are provided for illustrative purposes and that there can be many variations, substitute processes, and/or other possibilities associated with the disclosed technology.

In some embodiments, the road identification module 204 and/or the filtering module 206 can be replaced and/or supplemented with other approaches. In one example, the first map can correspond to an aerial image, such as a satellite image. In this example, the first map corresponding to the aerial image can be converted into a first vector map based on machine learning. For instance, one or more machine learning processes can be utilized to perform labeling with respect to the first map in order to facilitate generating the first vector map. In some implementations, the one or more machine learning processes can utilize classifiers, structured prediction, neural networks, and/or various other techniques to facilitate generating the first vector map based on the first map corresponding to the aerial image. More details regarding machine learning for aerial image labeling is discussed in Mnih, V. (2013). Machine Learning for Aerial Image Labeling. In another example, the first map can correspond to a map including Global Positioning System (GPS) data, such as sparse GPS trace data. In this example, the first vector map can be generated from the first map based on map inference utilizing the GPS data. In some implementations, one or more techniques such as a kernel density estimation (KDE), a trace clustering algorithm, a k-means algorithm, and/or a trace merging algorithm, etc., can be utilized during map inference to facilitate generating the first vector map based on the first map including the GPS data. More details regarding this approach is discussed in Liu, X., Wang, Y., Forman, G., Biagioni, J., Eriksson, J., and Zhu, Y. (2012). Mining Large-Scale, Sparse GPS Traces for Map Inference: Comparison of Approaches. Again, it should be appreciated that many variations associated with the disclosed technology are possible.

Figure 2B:
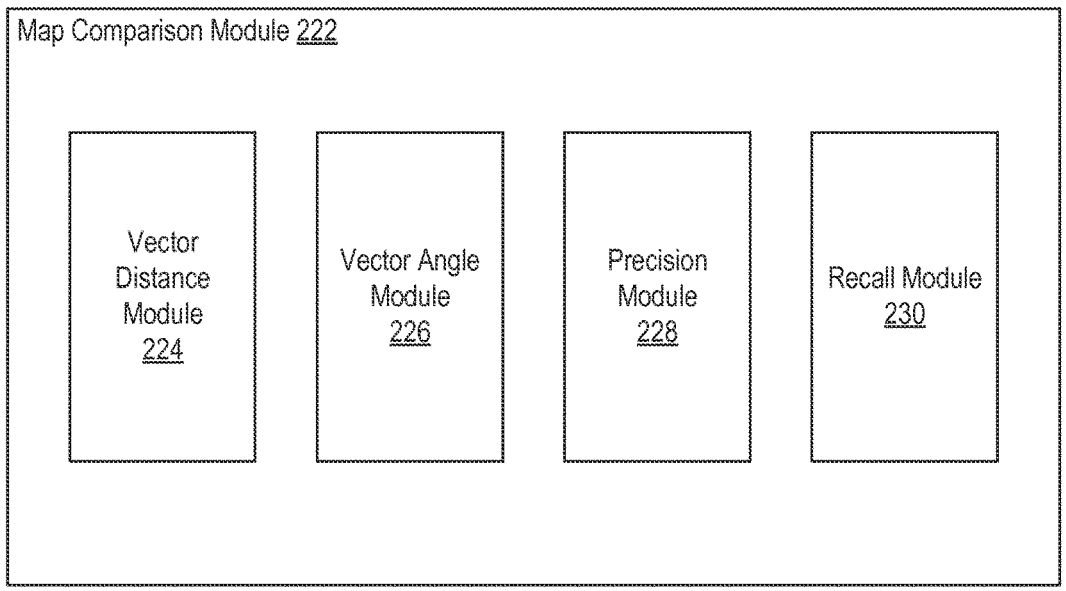
FIG. 2B illustrates an example map comparison module configured to facilitate providing quantitative evaluation of map quality, according to an embodiment of the present disclosure.

FIG. 2B illustrates an example map comparison module 222 configured to facilitate providing quantitative evaluation of map quality, according to an embodiment of the present disclosure. In some embodiments, the map comparison module 108 of FIG. 1 can be implemented as the example map comparison module 222. As shown in FIG. 2B, the map comparison module 222 can include a vector distance module 224, a vector angle module 226, a precision module 228, and a recall module 230.

As discussed above, the map comparison module 222 can be configured to facilitate providing, based on a first vector map and a second vector map, one or more quantitative evaluations for at least one of a first map or a second map. In some cases, the first vector map can include a first set of vectors, which can represent a first set of roads provided by the first map. The second vector map can include a second set of vectors, which can represent a second set of roads provided by the second map. The one or more quantitative evaluations can compare each vector segment in the first set of vectors with a respective vector segment in the second set of vectors.

In some embodiments, comparing each vector segment in the first set of vectors with a respective vector segment in the second set of vectors can include comparing the distance and angle between the vector segments. The vector distance module 224 can compare the distance (e.g., Hausdorff distance) between vector segments. For example, the vector distance module 224 can determine that two vector segments are considered to be matching if they are within a specified allowable distance deviation from each other. In this example, the specified allowable distance deviation can correspond to a distance of 10 meters. The vector angle module 226 can compare the angle between the vector segments. For instance, the vector angle module 226 can determine that two vector segments are considered to be matching if they are within a specified allowable angle deviation from each other. In this instance, the specified allowable distance deviation can correspond to an angle of 30 degrees. It should be appreciated that all examples herein are provided for illustrative purposes and that there can be many variations, different values, or other possibilities associated with the disclosed technology.

In some implementations, if two vector segments from the first and second vector maps match, then the match can be recorded and those two vector segments can be deemed to be completed (e.g., can be removed from the first and second vector maps). The comparison can then continue with the next two vector segments in the first and second vector maps, and so forth. Any vector segment that exists in one vector map but not in the other vector map can be considered to be extra in the former vector map and can be considered to be missing in the latter vector map. Moreover, in some embodiments, visual representations for the vectors can be generated. For example, different colors can be used to represent different vector maps. As such, when the first and second vector maps are overlaid on one another, their different colors can be more easily visible. In some cases, for instance, matching vector segments can be colored green, extra vector segments in a vector map can be colored blue, and missing vector segments in the vector map can be colored red.

Additionally, in some embodiments, the one or more quantitative evaluations can include at least one of a precision evaluation or a recall evaluation. The precision module 228 can calculate the precision of a target map with respect to a source map. In some cases, the source map can be considered to be a ground truth map. The precision can indicate how accurate or precise the target map is with respect to the source map. For example, the precision module 228 can calculate the precision to be the length of matching segments divided by the total length of segments in the target map (e.g., the sum of the length of matching segments and the length of extra segments in the target map). The recall module 230 can calculate the recall of the target map with respect to the source map. The recall can indicate the quality of the coverage of, or how much is represented by, the target map with respect to the source map. For example, the recall module 230 can calculate the recall to be the length of matching segments divided by the total length of segments in the source map (e.g., the sum of the length of matching segments and the length of missing segments in the target map). In some cases, high precision (i.e., a precision value that satisfies a precision threshold value) and high recall (i.e., a recall value that satisfies a recall threshold value) can indicate that the two vector maps are very similar. Further, in some instances, the source map can correspond to the first map and the target map can correspond to the second map, or vice versa. Again, it is contemplated that many variations are possible.

Figure 3A:
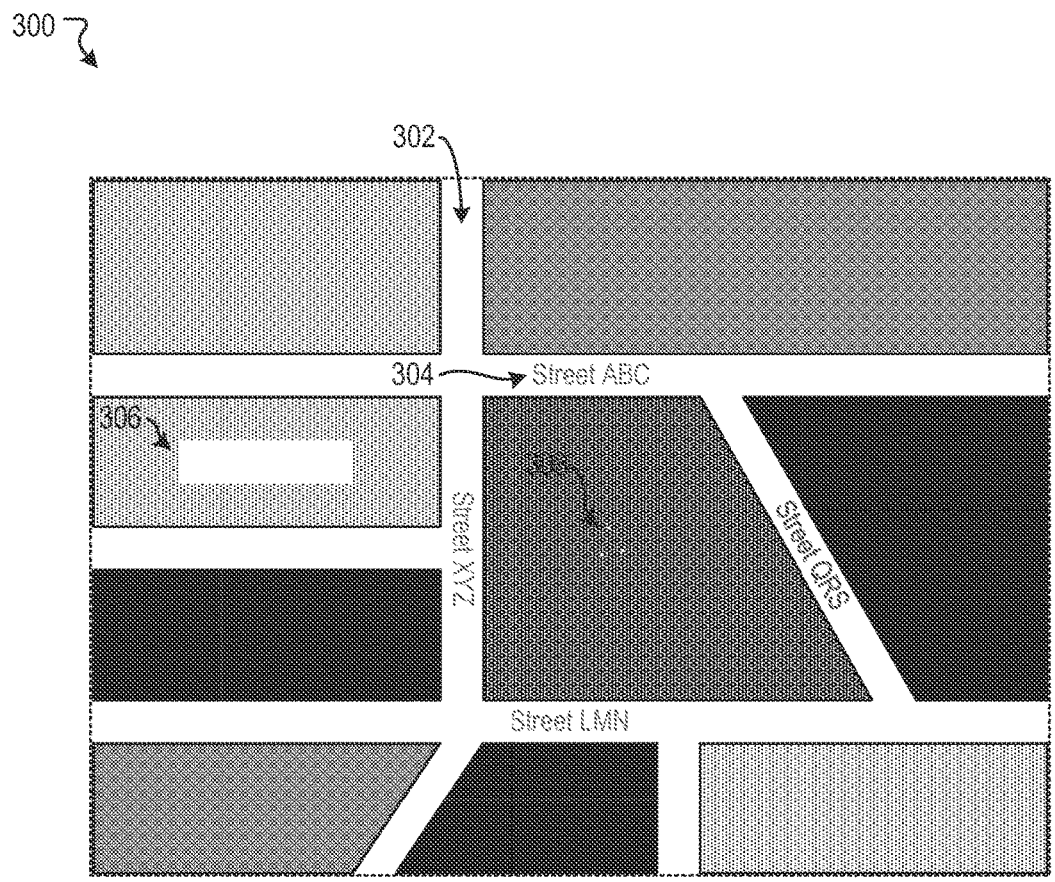
FIG. 3A illustrates an example scenario associated with providing quantitative evaluation of map quality, according to an embodiment of the present disclosure.

FIG. 3A illustrates an example scenario 300 associated with providing quantitative evaluation of map quality, according to an embodiment of the present disclosure. The example scenario 300 illustrates an image-based map (or a portion thereof) acquired from a map system, service, or source, etc. The image map can provide one or more roads 302, such as streets, lanes, boulevards, expressways, highways, or other routes, etc. As shown, the map can also provide or show one or more street names 304 associated with the one or more roads 302. In this example scenario 300, there can be a courtyard 306 within one of the street blocks. Moreover, in this example, there can be some noise 308 in the image map.

Figure 3B:
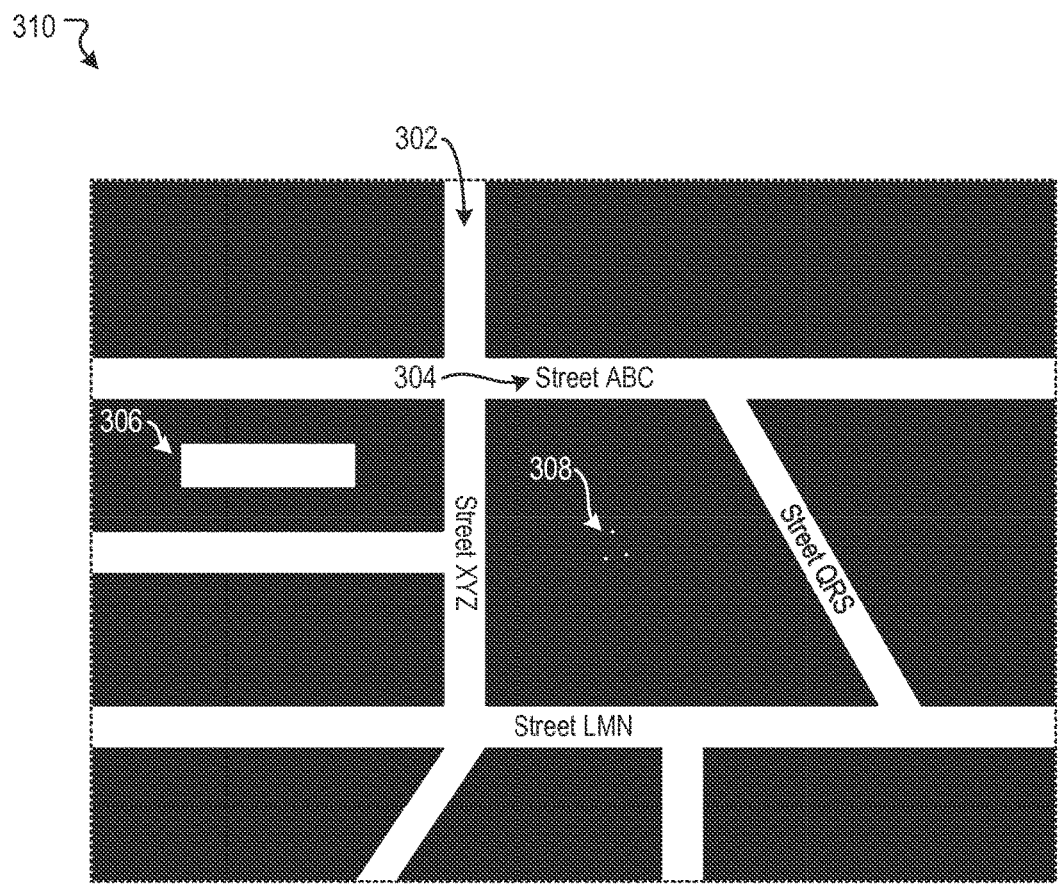
FIG. 3B illustrates an example scenario associated with providing quantitative evaluation of map quality, according to an embodiment of the present disclosure.

FIG. 3B illustrates an example scenario 310 associated with providing quantitative evaluation of map quality, according to an embodiment of the present disclosure. The example scenario 310 illustrates a vector map generation (or conversion) process being initiated and/or applied to the image map of FIG. 3A. In the example scenario 310 of FIG. 3B, the disclosed technology can recognize that the one or more roads 302 are white colored. As such, the disclosed technology can determine or identify the portions of the map that are white (or within an allowable threshold of being white) and can recognize the one or more roads 302 of the map as being included in those portions. Moreover, all other portions of the map can be changed into a black color. In this example scenario 310, the street names 304 and the street blocks can be changed into the black color. However, the courtyard 306 and the noise 308 can remain white.

Figure 3C:
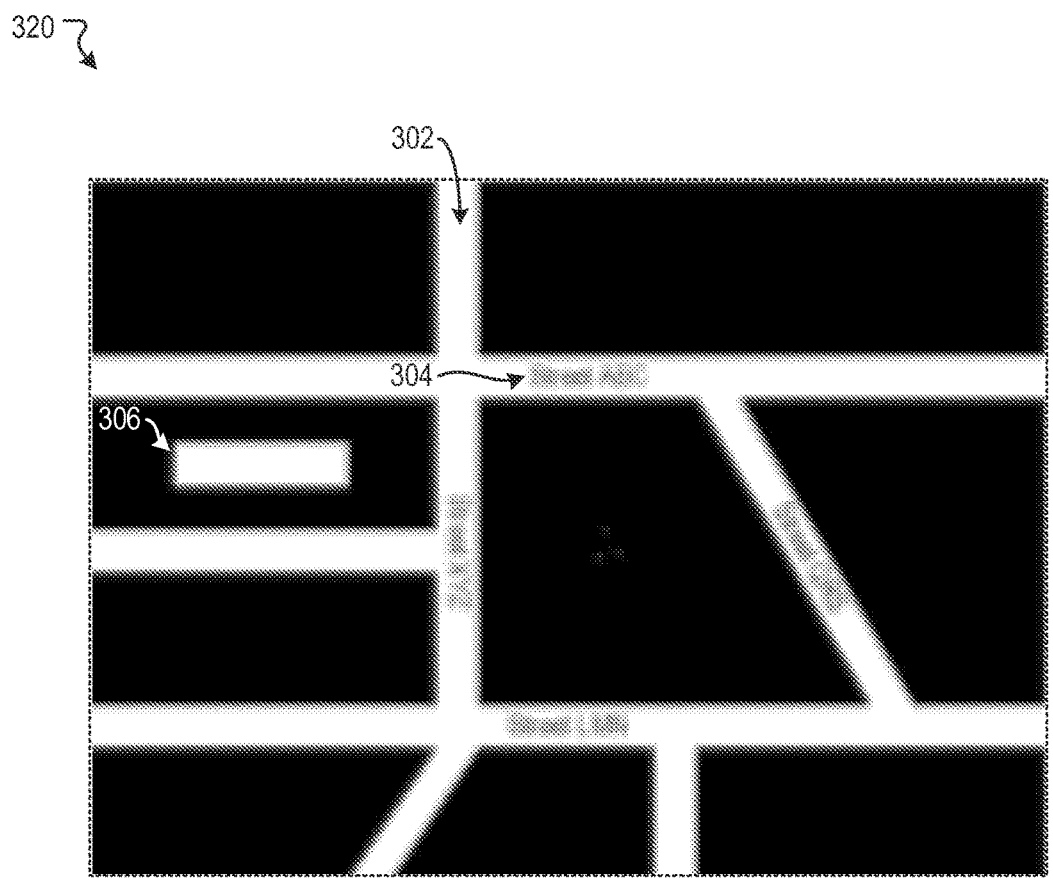
FIG. 3C illustrates an example scenario associated with providing quantitative evaluation of map quality, according to an embodiment of the present disclosure.

FIG. 3C illustrates an example scenario 320 associated with providing quantitative evaluation of map quality, according to an embodiment of the present disclosure. The example scenario 320 illustrates the vector map generation process being applied to the map of FIG. 3B. In the example scenario 320 of FIG. 3C, the disclosed technology can apply a blurring process to the image map. The blurring process can cause the black colored street names 304 to appear to more closely resemble the white color (e.g., to appear to have a light gray color). Moreover, the blurring process can cause the white colored noise to be blended in with the black colored street block (e.g., to appear to have a dark gray color). In this example, the courtyard 306 remains substantially white.

Figure 3D:
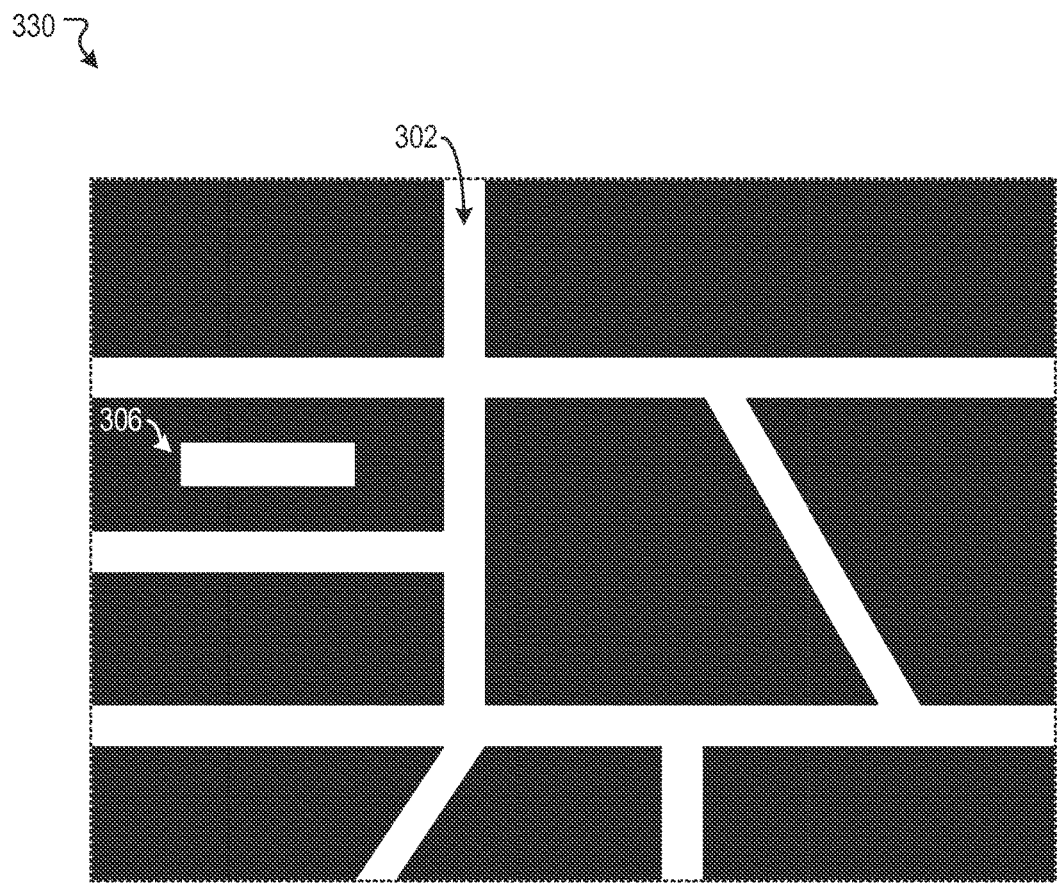
FIG. 3D illustrates an example scenario associated with providing quantitative evaluation of map quality, according to an embodiment of the present disclosure.

FIG. 3D illustrates an example scenario 330 associated with providing quantitative evaluation of map quality, according to an embodiment of the present disclosure. The example scenario 330 illustrates the vector map generation process being applied to the map of FIG. 3C. In the example scenario 330 of FIG. 3D, the disclosed technology can broaden the allowable deviation (or lower a threshold) for what is considered to be white colored. As such, the disclosed technology can determine that particular map portions, such as the light gray street names, are considered to be white colored based on the broadened allowable deviation (or the lowered threshold). The disclosed technology can, in some cases, color these particular portions white. Moreover, the disclosed technology can, in some instances, color all portions other than these particular portions black. As such, the dark gray noise can be removed, filtered out, or blended in with the black street block.

Figure 3E:
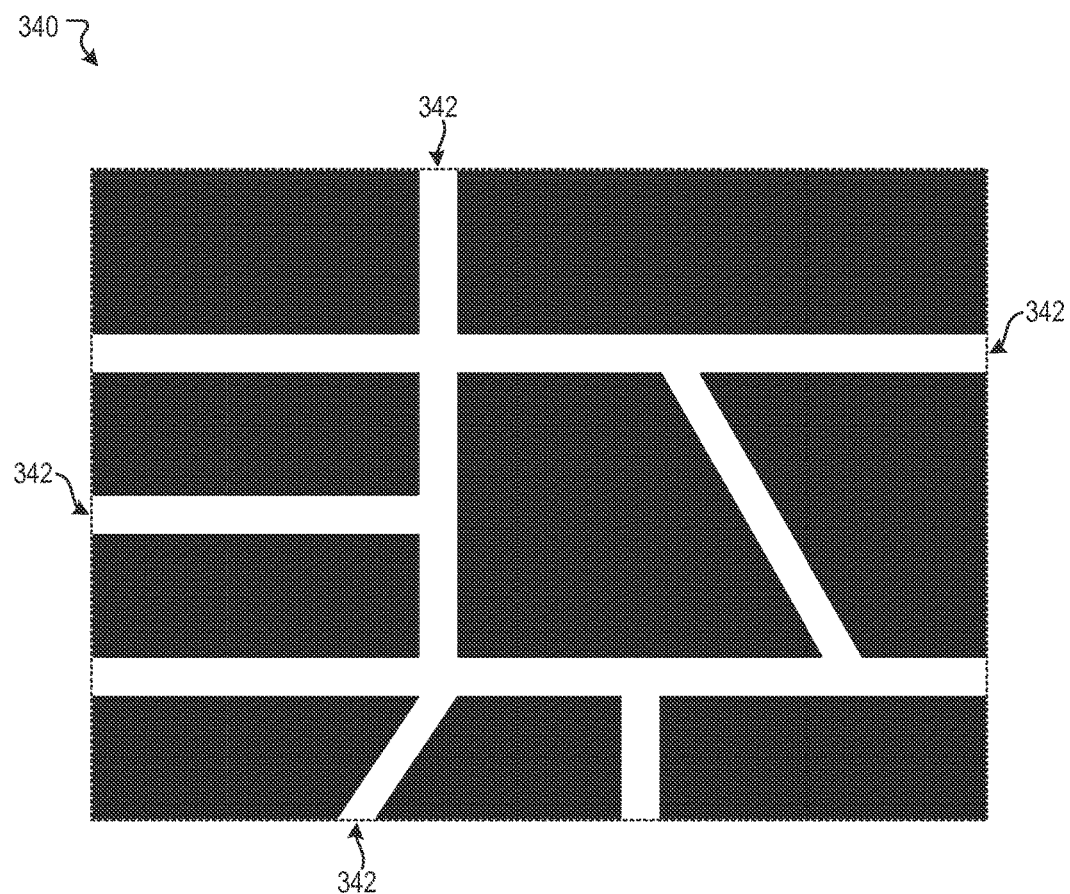
FIG. 3E illustrates an example scenario associated with providing quantitative evaluation of map quality, according to an embodiment of the present disclosure.

FIG. 3E illustrates an example scenario 340 associated with providing quantitative evaluation of map quality, according to an embodiment of the present disclosure. The example scenario 340 illustrates the vector map generation process being applied to the map of FIG. 3D. In the example scenario 340 of FIG. 3E, the disclosed technology can further detect one or more borders, boundaries, or edges 342 of the map. The disclosed technology can detect map portions that are white, but that are disconnected or unconnected via the white color (e.g., via the white roads) to the one or more borders 342 of the map. These map portions can also be removed, filtered out, or changed into the black color. In this example, the courtyard has been changed into the black color. As such, in this example, all roads have the white color, whereas all non-road or other irrelevant map portions have been removed, filtered out, or colored black.

Figure 3F:
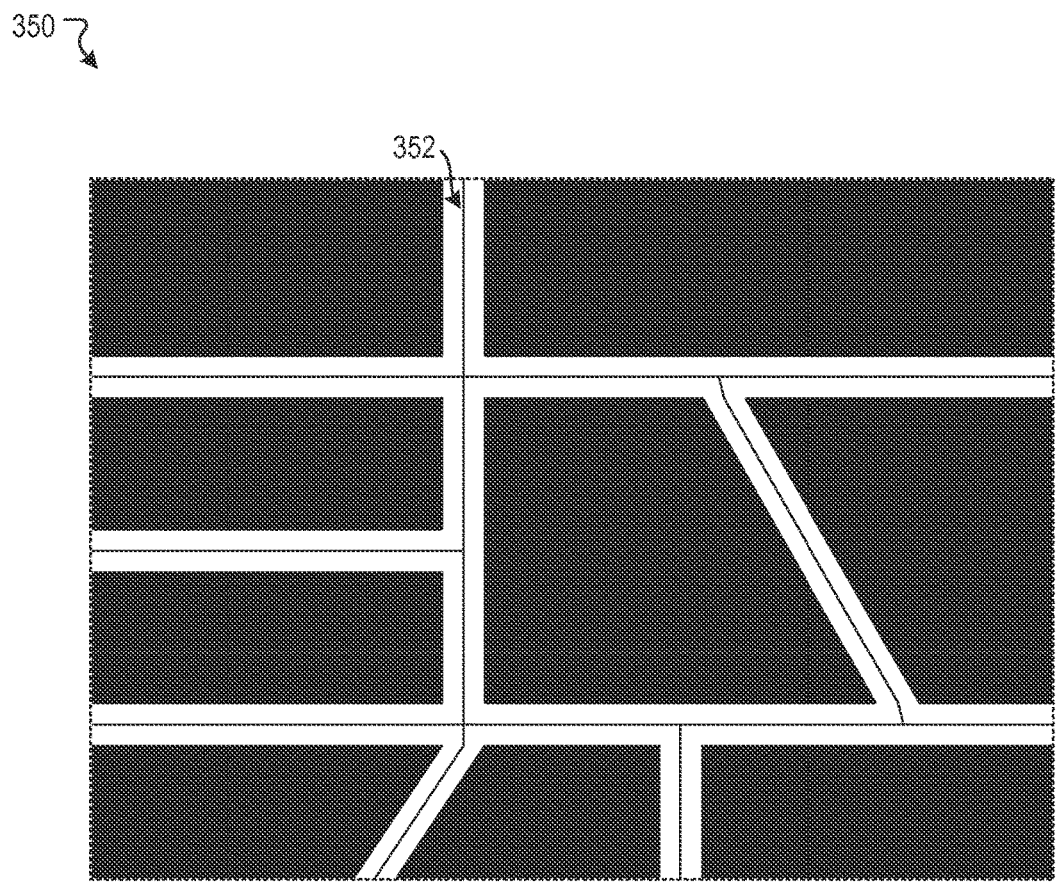
FIG. 3F illustrates an example scenario associated with providing quantitative evaluation of map quality, according to an embodiment of the present disclosure.

FIG. 3F illustrates an example scenario 350 associated with providing quantitative evaluation of map quality, according to an embodiment of the present disclosure. The example scenario 350 illustrates the vector map generation process being applied to the map of FIG. 3E. In the example scenario 350 of FIG. 3F, the disclosed technology can provide a set of vectors 352 representing the roads in the map. In some implementations, the disclosed technology can cause each vector in the set of vectors 352 to be generated and centered with respect to the white colored portions (e.g. the white roads) of the map. For instance, the disclosure technology can utilize a Voronoi diagram process applied to the white roads to generate the set of vectors 352 for the vector map. In some cases, the set of vectors 352 can also be smoothed based on a vector smoothing process. As discussed previously, it should be appreciated that all examples herein are provided for illustrative purposes and that many variations associated with the disclosed technology are possible.

FIG. 4 illustrates an example method 400 associated with providing quantitative evaluation of map quality, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can acquire a first map that represents a particular geographical region. The first map can be associated with an image map. At block 404, the example method 400 can generate a first vector map based on the image map with which the first map is associated. At block 406, the example method 400 can acquire a second map that represents the particular geographical region. The second map can be different from the first map and can be associated with a second vector map. At block 408, the example method 400 can provide, based on the first vector map and the second vector map, one or more quantitative evaluations for at least one of the first map or the second map.

Figure 5:
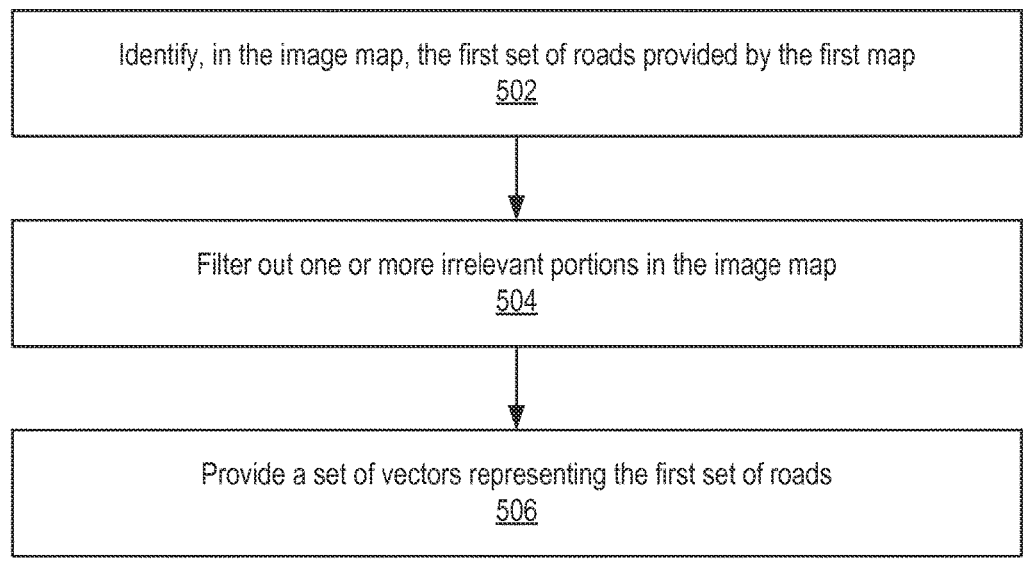
FIG. 5 illustrates an example method associated with providing quantitative evaluation of map quality, according to an embodiment of the present disclosure.

FIG. 5 illustrates an example method 500 associated with providing quantitative evaluation of map quality, according to an embodiment of the present disclosure. As discussed, it should be understood that there can be additional, fewer, or alternative steps performed in similar or alternative orders, or in parallel, within the scope of the various embodiments unless otherwise stated.

At block 502, the example method 500 can identify, in the image map, the first set of roads provided by the first map. At block 504, the example method 500 can filter out one or more irrelevant portions in the image map. At block 506, the example method 500 can provide a set of vectors representing the first set of roads. The first vector map can include the set of vectors.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
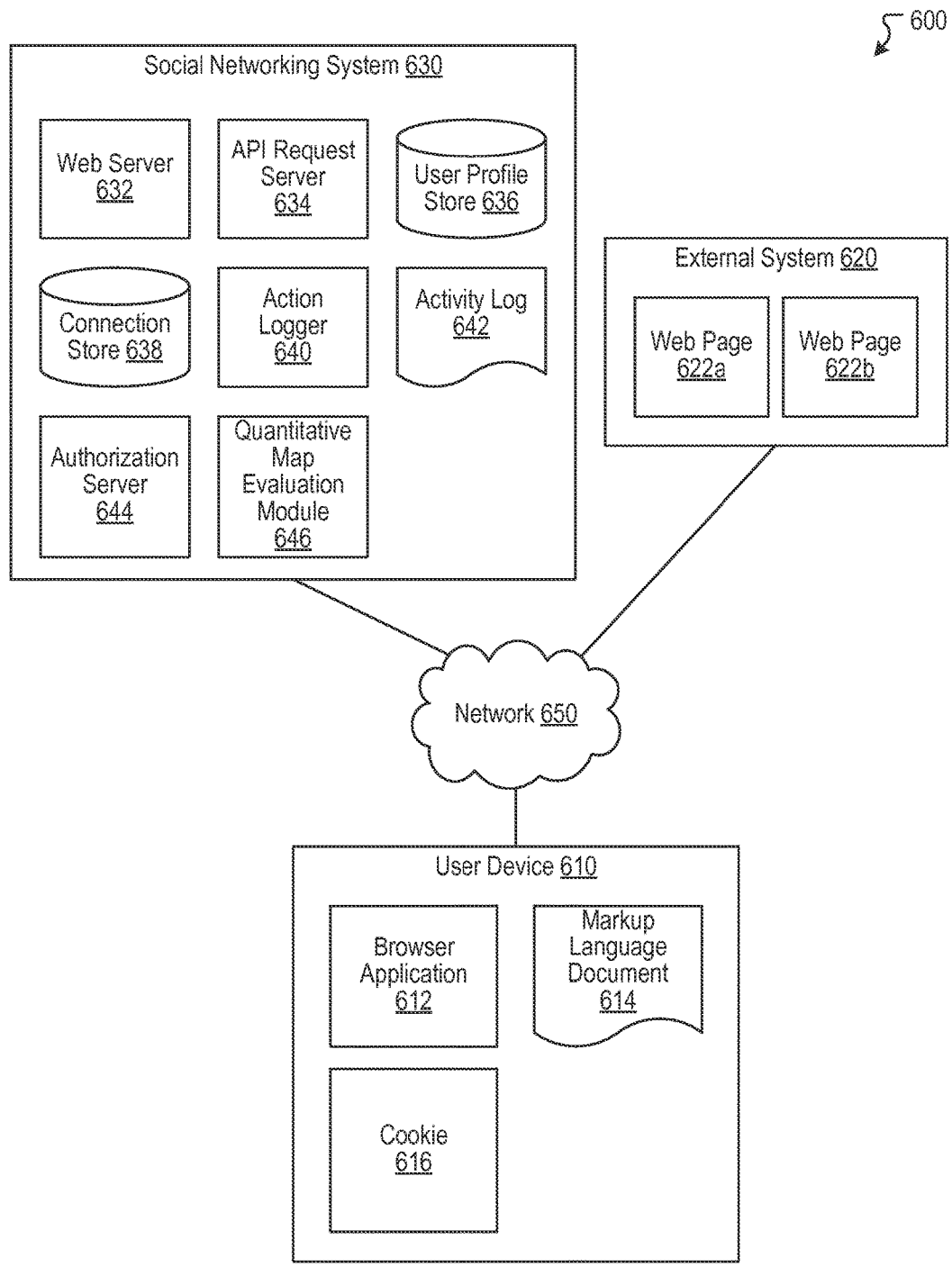
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet. In some embodiments, the social networking system 630 can include or correspond to a social media system (or service).

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the networking system 630 can include a quantitative map evaluation module 646. The quantitative map evaluation module 646 can, for example, be implemented as the quantitative map evaluation module 102 of FIG. 1. As discussed previously, it should be appreciated that there can be many variations or other possibilities. For example, in some instances, the quantitative map evaluation module (or at least a portion thereof) can be included or implemented in the social user device 610. Other features of the quantitative map evaluation module 646 are discussed herein in connection with the quantitative map evaluation module 102.

Hardware Implementation

Figure 7:
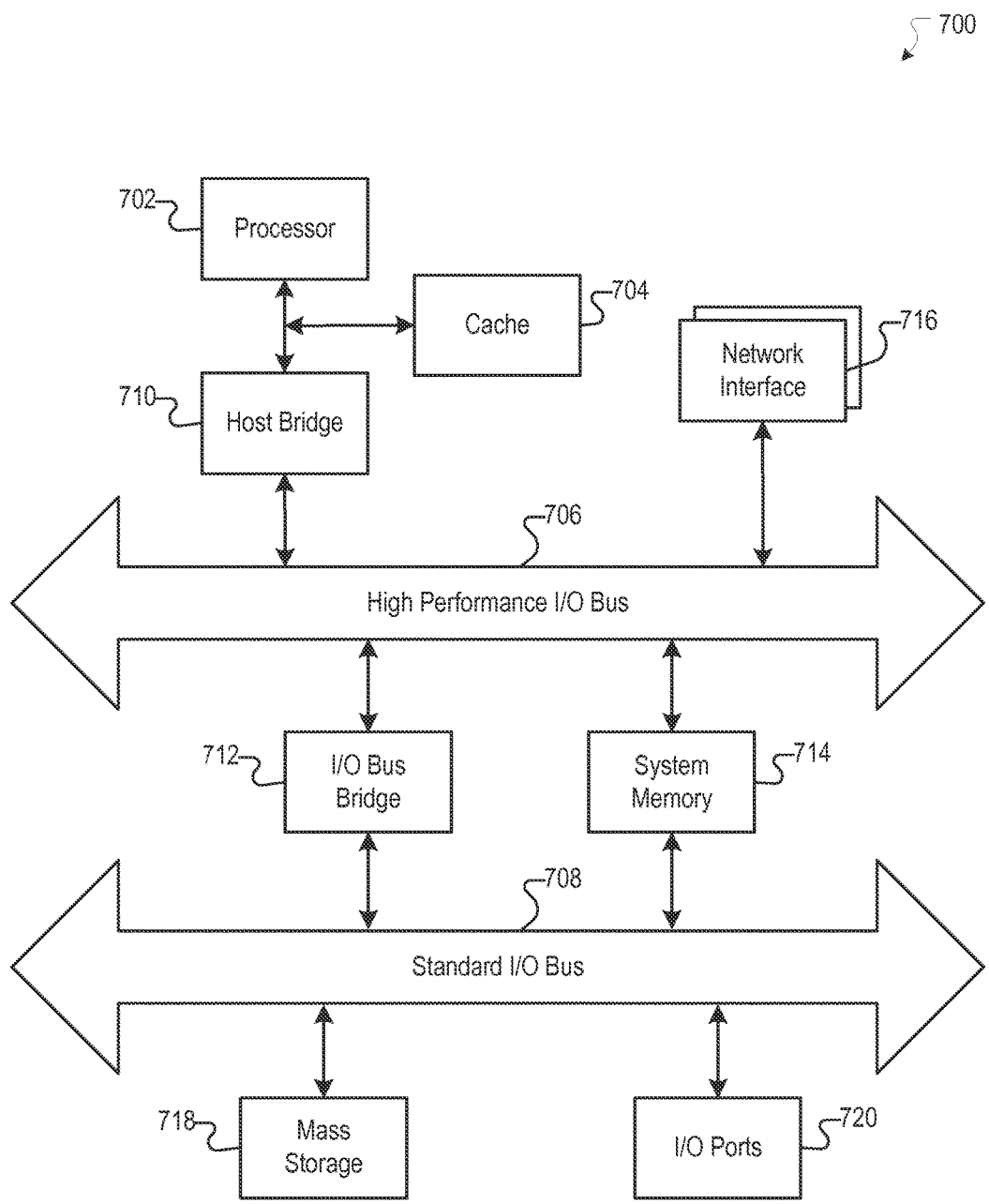
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   acquiring, by a computing system, a first map that represents a particular geographical region, the first map being associated with an image map;
   applying, by the computing system, a blurring process to the image map;
   identifying, by the computing system, a first set of roads on the blurred image map, wherein the first set of roads corresponds to an allowable threshold of a color on the image map;
   generating, by the computing system, a first vector map based on the image map with which the first map is associated, wherein the first vector map includes a set of vectors representing the first set of roads identified on the image map;

acquiring, by the computing system, a second map that represents the particular geographical region, the second map being different from the first map and being associated with a second vector map;

providing, by the computing system, based on the first vector map and the second vector map, one or more quantitative evaluations of the second map relative to the first map for at least one of the first map or the second map; and comparing, by the computing system, the first map to the second map based on the quantitative evaluations.

2. The computer-implemented method of claim 1, wherein the first map provides the first set of roads determined by a first map system to be included in the particular geographical region, and wherein the second map provides a second set of roads determined by a second map system to be included in the particular geographical region.

3. The computer-implemented method of claim 2, wherein generating the first vector map based on the image map with which the first map is associated further comprises:

filtering out one or more irrelevant portions in the image map; and providing the set of vectors representing the first set of roads, wherein the first vector map includes the set of vectors.

4. The computer-implemented method of claim 3, wherein the set of vectors included in the first vector map are smoothed based on a vector smoothing process.

5. The computer-implemented method of claim 3, wherein identifying, in the image map, the first set of roads provided by the first map further comprises:

selecting a first color associated with the first set of roads provided by the first map; and identifying a first set of one or more map portions in the image map that have, within an allowable first color deviation, the first color.

6. The computer-implemented method of claim 5, wherein filtering out the one or more irrelevant portions in the image map further comprises:

identifying a second set of one or more map portions in the image map that are colored differently from the first color and that are outside the allowable first color deviation;

coloring the second set with a second color different from the first color;

applying a blurring process to the image map including the first color and the second color;

broadening the allowable first color deviation to produce a broadened allowable first color deviation;

identifying a third set of one or more map portions in the image map that are colored differently from the first color and that are outside the broadened allowable first color deviation; and coloring the third set with the second color, wherein the one or more irrelevant portions are colored with the second color.

7. The computer-implemented method of claim 6, wherein filtering out the one or more irrelevant portions in the image map further comprises:

detecting one or more borders of the image map;

identifying a fourth set of one or more map portions in the image map that have, within the broadened allowable first color deviation, the first color and that are disconnected, via the first color within the broadened allowable first color deviation, to the one or more borders of the image map; and coloring the fourth set with the second color, wherein the one or more irrelevant portions are colored with the second color.

8. The computer-implemented method of claim 6, wherein identifying, in the image map, the first set of roads provided by the first map further comprises:

identifying a fifth set of one or more map portions in the image map that have, within the broadened allowable first color deviation, the first color, wherein each vector in the set of vectors is centered with respect to a respective map portion in the fifth set.

9. The computer-implemented method of claim 1, wherein the first vector map includes a first set of vectors, wherein the second vector map includes a second set of vectors, and wherein the one or more quantitative evaluations compare each vector segment in the first set of vectors with a respective vector segment in the second set of vectors.

10. The computer-implemented method of claim 9, wherein the one or more quantitative evaluations includes at least one of a precision evaluation or a recall evaluation.

11. A system comprising:

at least one processor; and a memory storing instructions that, when executed by the at least one processor, cause the system to perform:

acquiring a first map that represents a particular geographical region, the first map being associated with an image map;

applying a blurring process to the image map;

identifying a first set of roads on the blurred image map, wherein the first set of roads corresponds to an allowable threshold of a color on the image map;

generating a first vector map based on the image map with which the first map is associated, wherein the first vector map includes a set of vectors representing the first set of roads identified on the image map;

acquiring a second map that represents the particular geographical region, the second map being different from the first map and being associated with a second vector map;

providing, based on the first vector map and the second vector map, one or more quantitative evaluations of the second map relative to the first map; and comparing the first map to the second map based on the quantitative evaluations.

12. The system of claim 11, wherein the first map provides the first set of roads determined by a first map system to be included in the particular geographical region, and wherein the second map provides a second set of roads determined by a second map system to be included in the particular geographical region.

13. The system of claim 12, wherein generating the first vector map based on the image map with which the first map is associated further comprises:

filtering out one or more irrelevant portions in the image map; and providing the set of vectors representing the first set of roads, wherein the first vector map includes the set of vectors.

14. The system of claim 11, wherein the first vector map includes a first set of vectors, wherein the second vector map includes a second set of vectors, and wherein the one or more quantitative evaluations compare each vector segment in the first set of vectors with a respective vector segment in the second set of vectors.

15. The system of claim 14, wherein the one or more quantitative evaluations includes at least one of a precision evaluation or a recall evaluation.

16. A non-transitory computer-readable storage medium including instructions that, when executed by at least one processor of a computing system, cause the computing system to perform a method comprising:
- acquiring a first map that represents a particular geographical region, the first map being associated with an image map;
- applying a blurring process to the image map;
- identifying a first set of roads on the blurred image map, wherein the first set of roads corresponds to an allowable threshold of a color on the image map;
- generating a first vector map based on the image map with which the first map is associated, wherein the first vector map includes a set of vectors representing the first set of roads identified on the image map;
- acquiring a second map that represents the particular geographical region, the second map being different from the first map and being associated with a second vector map;
- providing, based on the first vector map and the second vector map, one or more quantitative evaluations of the second map relative to the first map; and
- comparing the first map to the second map based on the quantitative evaluations.

17. The non-transitory computer-readable storage medium of claim 16, wherein the first map provides the first set of roads determined by a first map system to be included in the particular geographical region, and wherein the second map provides a second set of roads determined by a second map system to be included in the particular geographical region.

18. The non-transitory computer-readable storage medium of claim 17, wherein generating the first vector map based on the image map with which the first map is associated further comprises:
- filtering out one or more irrelevant portions in the image map; and
- providing the set of vectors representing the first set of roads, wherein the first vector map includes the set of vectors.

19. The non-transitory computer-readable storage medium of claim 16, wherein the first vector map includes a first set of vectors, wherein the second vector map includes a second set of vectors, and wherein the one or more quantitative evaluations compare each vector segment in the first set of vectors with a respective vector segment in the second set of vectors.

20. The non-transitory computer-readable storage medium of claim 19, wherein the one or more quantitative evaluations includes at least one of a precision evaluation or a recall evaluation.

* * * * *